United States Patent [19]
Takanohashi et al.

[11] 4,264,938
[45] Apr. 28, 1981

[54] MAGNETIC HEAD FOR A TAPE PLAYER

[75] Inventors: Kenzi Takanohashi; Jiro Asahina, both of Yokohama, Japan

[73] Assignee: Victor Company of Japan, Limited, Japan

[21] Appl. No.: 24,876

[22] Filed: Mar. 28, 1979

[30] Foreign Application Priority Data

Mar. 30, 1978 [JP] Japan .................... 53-37333

[51] Int. Cl.³ .................................. G11B 5/12
[52] U.S. Cl. .................................... 360/118
[58] Field of Search ........................ 360/118, 121

[56] References Cited

U.S. PATENT DOCUMENTS

| 2,950,355 | 8/1960 | Moehring | 360/118 |
| 3,882,544 | 5/1975 | Hughes | 360/118 |
| 3,949,422 | 4/1976 | Sato et al. | 360/118 |

FOREIGN PATENT DOCUMENTS 534786  4/1975  U.S.S.R. .................... 360/118

Primary Examiner—Robert S. Tupper
Attorney, Agent, or Firm—Lowe, King, Price & Becker

[57] ABSTRACT

A magnetic head for a tape player comprises a head tip having a recess and a center tip interposed in the recess via spacers, and a back core having an L-shaped core and a center core. The L-shaped core has a like recess and the front end of the center core is interposed in the recess of the L-shaped core without coming into contact with the L-shaped core, while the other ends of the L-shaped core and the center core are connected to each other. A winding is provided around the center core, while the head tip is fixedly attached to the front surface of the back core so as to constitute a magnetic circuit, thereby providing a narrow head tip width erase head, while erasure efficiency is maintained high.

12 Claims, 7 Drawing Figures

MAGNETIC HEAD FOR A TAPE PLAYER

FIELD OF THE INVENTION

This invention generally relates to a magnetic head used in a tape player. More particularly, the present invention relates to an improvement in reduction of size of a magnetic head, such as an erase head.

BACKGROUND OF THE INVENTION

Recently, a new magnetic tape the coercive force of which is extremely high (Hc=1200 Oe) as a metallic tape is provided. In order to erase the signals recorded on such a magnetic tape, the erasure ratio (degree of erasure) must be over −65 dB. Since it has been required to increase the size of the erase head in order to increase the erasure ratio sufficient to erase the signals prerecorded on such a new type tape, bulky erase heads had to be used. However, when an erase head is assembled in a cassette tape recorder (player), the size of the erase head is required to be small enough since there is less space for the erase head.

SUMMARY OF THE INVENTION

The present invention has been achieved in order to remove the above described contradiction inherent to the conventional erase head.

It is, therefore, an object of the present invention to provide an erase head by which erasure ratio over −65 dB is obtained.

Another object of the present invention is to provide such an erase head the tip width of which is extremely small, such as not greater than 2.5 mm.

A further object of the present invention is to provide such an erase head of a composite type which admits of high saturation magnetic flux in the vicinity of junctions between a head tip and a back core.

A still further object of the present invention is to provide such an erase head in which the head tip and the back core include particular members of specific shapes so as to provide a large area of junction therebetween.

BRIEF DESCRIPTION OF THE DRAWINGS

These and other objects and features of the present invention will become more readily apparent from the following detailed description of the preferred embodiments taken in conjunction with the accompanying drawings in which.

DETAILED DESCRIPTION OF THE PREFERRED EMBODIMENTS

Prior to describing the preferred embodiments of the erase head according to the present invention, conventional erase heads will be discussed for a better understanding of the objects of the present invention.

Figure 1:
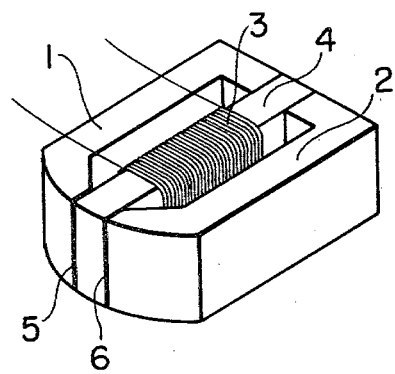
FIG. 1 shows a perspective view of a conventional erase head.

The magnetic coercive force of conventional magnetic tapes is approximately 300 Oe (when ferrite is used as the magnetic substance) or 500 Oe (when $CrO_2$ is used as the magnetic substance). FIG. 1 shows an example of a conventional erase head which has been used to erase signals prerecorded on such a conventional magnetic tape. The erase head comprises a pair of side cores 1 and 2 made of ferrite which has high resistance to wear and a superior high-frequency characteristic, a center core 4 having a winding 3, nonmagnetic spacers 5 and 6. The side cores 1 and 2 and the center core 4 are integrally assembled via the spacers 5 and 6 which provide magnetic gaps therebetween. When this erase head shown in FIG. 1 is used to erase signals prerecorded on the above-mentioned regular conventional magnetic tape, the erasure ratio is approximately −70 dB. However, when this erase head is used to erase signals prerecorded on a metallic tape, it has been found that the erase head is not practical at all since the maximum erasure ratio is about −50 dB. The reason that the erasure ratio is so low is as follows. Since the cross-sectional area of the cores 1, 2 and 4 in the vicinity of the gaps, which function as magnetic paths, is small, when ferrite, the saturation magnetic flux (indication) Bs of which is about 4000 gauss, is used for the cores 1, 2 and 4, the gap portions are first saturated with magnetic flux, under application of a required current. Therefore, even though the electric current is increased, it is impossible to erase the signals prerecorded on such a metallic magnetic tape to an extent that is practical for the next recording.

In order to overcome the above described disadvantage a new erase head of a composite type is recently developed. The new type erase head comprises a head tip which is used as a core member in the vicinity of the head gap, and a back core. The head tip is made of Sendust (an alloy of Fe, Si and Al) which has a high saturation magnetic flux, for instance 10,000 gauss, and a high resistance to wear, while the back core is made of ferrite since the cross-sectional area of the magnetic paths in the back core may be made large.

Figure 2:
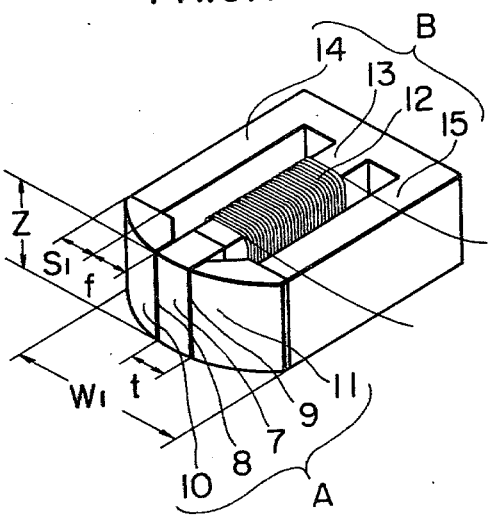
FIG. 2 shows a perspective view of a conventional composite type erase head.
Figure 3:
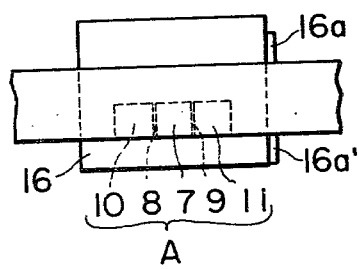
FIG. 3 is a front view of the erase head shown in FIG. 2, showing the relationship of the erase head and a magnetic tape.

As shown in FIG. 2, the above-mentioned composite type erase head comprises a head tip A and a back core B which are fixedly binded by suitable binding-agent. The head tip A includes a center tip 7 which is made of Sendust and a pair of side tips 10 and 11 which are also made of Sendust and are integrally formed via nonmagnetic spacers 8 and 9. The back core B includes a center core 13 around which a winding 12 is provided, and a pair of side cores 14 and 15 so that the back core B has an E-shape. When such a composite type erase head is used to erase signals prerecorded on a magnetic tape the coercive force of which is such as 1200 Oe, the erasure ratio obtained is about −70 dB.

However, when it is intended to provide a suitable erase head for a cassette tape player, i.e., the tip width of the erase head has to be within a predetermined length, without deteriorating the erasure ratio and the erasure efficiency, the following difficulties arise.

Referring to important points in designing an erase head having a superior erasing characteristic according to the technique shown in FIG. 2, the following three points have to be considered.

(1) It is necessary to reduce the magnetic resistance by making the areas of the junctions between respective core members, and also to relieve the magnetic saturation.

(2) Although it is preferable to reduce the length of the magnetic path as much as possible, the occurrence of a magnetic short circuit, which may occur when the leakage flux from the winding 12 get in the side cores 14 and 15, must be prevented by having a predetermined space between the center core 13 and each of the side cores 14 and 15 in such an E-shaped back core.

(3) It is necessary to employ a polishing method and select binding-agent so that the spaces between the cores when assembled, are made very small.

In the above three points, the first and second points means that the width $W_1$ of the head tip A has to be set wide. From the foregoing, it will be understood that it is quite impossible to reduce the width of the head tip A while the erasure efficiency is maintained at the before mentioned practical level.

Hereinbelow, an improved erase head according to the present invention will be described in connection with an erase head used in a cassette tape player (either a four-track two channel type or a two-track monaural type).

Figure 4:
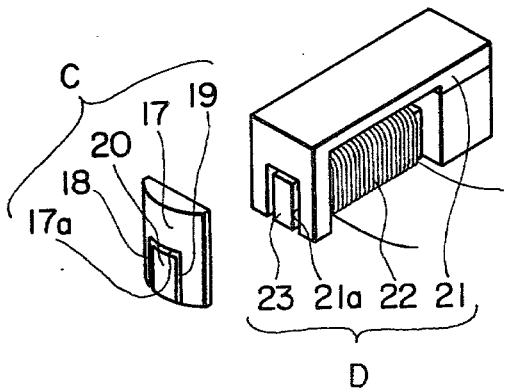
FIG. 4 shows an exploded perspective view of a first embodiment of a composite type erase head according to the present invention.
Figure 5:
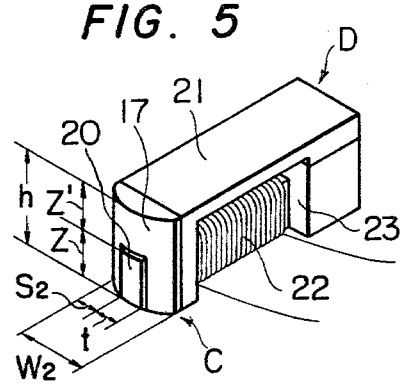
FIG. 5 shows a perspective view of the erase head shown in FIG. 4 when assembled.
Figure 6:
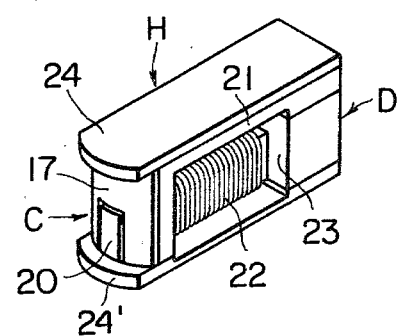
FIG. 6 shows a perspective view of the erase head shown in FIG. 5 but additionally provided with tape guides.

Reference is now made to FIG. 4, FIG. 5 and FIG. 6 which show a first preferred embodiment of a composite type erase head according to the present invention. In FIG. 4 an exploded view of the erase head is shown; in FIG. 5 a perspective view of the erase head when assembled is shown; and in FIG. 6 a perspective view of the same erase head with tape guide is shown. The erase head comprises a head tip C and a back core D.

The head tip C includes a tip member 17 and a center tip 20. The tip member 17 has a rectangular recess or slot 17a extending from one end thereof so that the tip member 17 is substantially U-shaped. In other words, the tip member 17 has two leg portions. The tip member 17 has a curved front surface and a planar rear surface. It will be understood that the front surface of the tip member 17 will abut against a magnetic tape when the erase head is assembled in a tape player (not shown). The center tip 20 has a rectangular shape and is arranged to be interposed (received) in the recess of the tip member 17. The size, i.e. the width and the height of the center tip 20, is made slightly smaller than that of the recess so that the center tip 20 is interposed in the recess 17a via nonmagnetic spacers 18 and 19. Both of the tip member 17 and the center tip 20 are made of Sendust. The front surface of the tip member 17 and the front surface of the center tip 20 are aligned so as to be flush, while the rear surface of the tip member 17 and the rear surface of the center tip 20 are aligned so as to be flush. In other words, the front surface of the center tip 20 is curved in the same manner as the tip member 17, while the rear surface of the center tip 20 is made planar.

The back core D includes an L-shaped core 21 and a center core 23. The L-shaped core 21 has first and second portions arranged to meet at substantially right angles with each other. The first portion of the L-shaped core 21 has a recess or slot the shape of which is substantially same as that 17a provided in the tip member 17. In other words, the first portion of the L-shaped core 21 is substantially U-shaped to have a rectangular recess 21a. The center core 23 has front and rear ends where the rear end is made wider than the remaining portions of the center core 23. The front end of the center core 23 is interposed in the recess 21a provided in the first portion of the L-shaped core 21 without coming into contact with the L-shaped core 21. The front surface of the first portion of the L-shaped core 21 and the surface of the front end of the center core are aligned so as to be flush, while these surfaces are made planar. The center core 23 is provided with a winding 22. The rear end of the center core 23 is fixedly connected to the rear end of the second portion of the L-shaped core 21. Both of the L-shaped core 21 and the center core 23 are made of ferrite.

The rear surface of the head tip C and the front surface of the back core D are respectively polished so that these surfaces become smooth enough, and then these surfaces are binded to each other by means of, for instance, binding-agent. FIG. 5 shows the erase head when the head tip C is attached to the back core D. As will be seen, the rear surface of the tip member 17 is connected to the front surface of the first portion of the L-shaped core 21, while the rear surface of the center tip 20 is connected to the surface of the front end of the center core 23. With this arrangement, the head tip C and the back core D constitute a magnetic circuit.

Hereinbelow, it will be described that the width $S_2$ of the head tip C could be made considerably smaller than width $W_1$ of the before mentioned conventional composite type erase head (FIG. 2), while the erasing efficiency and the erasing ratio are not deteriorated.

Namely, as shown in FIG. 5, there are no magnetic materials which absorb the leakage flux on either side of the winding 22 disposed on the center core 23 and therefore, there is no need to have such a space "f" as in the E-shaped back core B shown in FIG. 2.

When comparing the junction areas between the core members and the tip members, the area of the junction between the center tip 7 of the head tip A and the center core 13 of the back core B of the erase head shown in FIG. 2 will be treated as substantially same as the area of the junction between the center tip 20 of the head tip C and the center core 23 of the back core D of the erase head shown in FIG. 5, which is of the present invention. However, in FIG. 2 which shows a conventional composite type erase head, the area of junction between the side core 14 or 15 of the E-shaped back core B and the side tip 10 or 11 of the head tip A will be expressed by the following equation.

$$Q = S_1 \times Z$$

wherein
$S_1$ is the width of the side core 14 or 15; and
Z is the height of the head tip A.

On the other hand, according to the present invention, the area of the junction corresponding to the junction in the conventional erase head shown in FIG. 2, will be obtained as follows via a simple calculation.

$$Q' = h \cdot S_2 + \frac{Z' \cdot t}{2} \tag{1}$$

wherein
h is the height of the head tip C; and
$Z'$ is expressed by $Z' \approx h - Z$
wherein Z is the height of the center tip 20. In the above, h is arranged to correspond to the width of a magnetic tape, and Z is arranged to correspond to the width of a track on the magnetic tape. Therefore, if $Z \approx Z'$, h will be expressed by $h \approx 2Z$ and thus the equation (1) will be rewritten as follows.

$$Q' = 2Z \cdot S_2 + \frac{Z \cdot t}{2} \quad (2)$$

Here, it is assumed that the most suitable area $S_1 \cdot Z$ has been determined for the combination of the conventional E-shaped back core B and the head tip A. When it is intended to find the length $S_2$ by which an area of junction equal to the area $S_1 \cdot Z$ is obtained, we will find that the length $S_2$ may be less than half of the length $S_1$.

The above described relationship between the areas of junction will be further described in connection with actual values. Assuming that, in FIG. 2 which shows the conventional erase head, $t=1$ mm, $f=1$ mm and $S_1=1$ mm, the width $W_1$ of the head tip A is 5 mm. On the other hand, according to the present invention, in FIG. 5, it is possible to set the values as follows: $t=1$ mm, $S_2=0.5$ mm (it is to be noted that the length $S_2$ can be half of $S_1$ as described hereinabove.) Namely, the total width $W_2$ of the head tip C is only 2 mm. Comparing the areas of the junctions in FIG. 2 and FIG. 5, it will be readily understood that the erasing efficiency of the erase head according to the present invention is the same as in the conventional erase head since the areas of junctions in these two are the same.

As will be seen in FIG. 6, the erase head according to the present invention may be equipped with two tape guide members 24 and 24' so that a magnetic tape correctly slides on the front surface of the head tip C. The first tape guide 24 is disposed on the upper surface of the head tip C and the upper surface of the L-shaped core 21, while the second tape guide 24' is disposed on the lower surface of the head tip C and the lower surface of the rear end portion of the center core 23. Each of the first and second tape guides 24 and 24' is projecting beyond the front surface of the head tip C constituting a parallel support so as to prevent excursion of a magnetic tape from the front surface of the head tip C.

Figure 7:
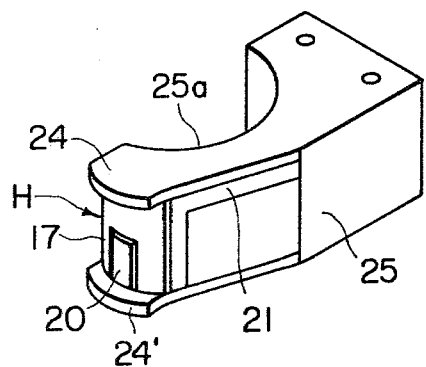
FIG. 7 shows a perspective view of a second embodiment of a composite type erase head according to the present invention.

Reference is now made to FIG. 7 which shows a second preferred embodiment of the erase head according to the present invention. The same elements shown in FIG. 6 are designated by the like numerals. The erase head shown in FIG. 7 is designed to be incorporated in a three-head type cassette tape player. The erase head assembly has a semicircular or curved recess 25a in which the pinch roller (capstan idler) will be interposed. Since the space for mounting the three heads in a cassette tape player is limited it is advantageous that the erase head has such a recess for effectively using the limited space. The erase head of the second embodiment has first and second tape guides 24 and 24' which are integrally formed with a core holder 25. Each of the tape guides 24 and 24' has the same shaped curved recess along one side thereof. Since each of the tape guides 24 and 24' covers the body of the erase head H, the shape of the erase head per se is arranged to have the same shaped curved recess. In other words, the L-shaped core 21 and the center core 23 (not shown in FIG. 7 but is shown in FIG. 6) are respectively so curved parallel with the tape guides 24 and 24' that none of the portions thereof project in the curved recess defined by the tape guide 24 and 24'.

In the above, the present invention has been described in connection with an erase head. However, the basic idea of the present invention is not limited to an erase head. In other words, the idea of the present invention may be adapted for record and reproduce heads so that high efficiency in recording and/or reproducing may be obtained.

It will be understood for those skilled in the art that many modifications and variations may be made without departing from the spirit of the instant invention.

What is claimed is:

1. A magnetic erase head for a tape player, comprising:
    (a) a head tip including a tip member and a center tip, said tip member having a first recess the depth of which corresponds to the track width of a magnetic tape, said first recess having one open side, said tip member having front and rear surfaces, on which front surface said magnetic tape slides, said center tip being interposed in said first recess via nonmagnetic spacers defining a magnetic gap between said center tip and said tip member, said recess being oriented such that said magnetic gap extends across a track to erase signals prerecorded on said track and such that the open side of said first recess is parallel to said track; and
    (b) a back core including an L-shaped core and a center core, said L-shaped core having first and second portions meeting at substantially right angles with each other, said first portion having a second recess the shape of which is substantially the same as that of said first recess, said center core having front and rear ends, said front end of said center core being interposed in said second recess without coming into contact with the L-shaped core, said center core being provided with a winding, said rear end of said center core being connected to the rear end of said second portion of said L-shaped core, the front surface of said first portion of said L-shaped core being connected to the rear surface of said tip member, said front end of said center core being connected to the rear surface of said center tip so that said head tip and said back core constitute a magnetic circuit.

2. A magnetic head as claimed in claim 1, wherein said back core includes a core holder having tape guides, said tape guides being curved so as to provide a space for a capstan idler, said L-shaped core and said center core being curved substantially parallel with said tape guides.

3. A magnetic head as claimed in claim 1, wherein each of said head tip and said first portion of said L-shaped core has a substantially U-shape.

4. A magnetic head as claimed in claim 1, wherein each of said first and second recesses has a rectangular shape, and wherein each of said center tip and said front end of said center core has a rectangular shape.

5. A magnetic head as claimed in claim 4, wherein the front surface of said tip member and the front surface of said center tip are aligned so as to be flush, and wherein the rear surface of said tip member and the rear surface of said center tip are aligned so as to be flush.

6. A magnetic head as claimed in claim 1, wherein said front surface of said first portion of said L-shaped core and the surface of said front end of said center core are aligned so as to be flush.

7. A magnetic head as claimed in claim 1, wherein the rear surface of said tip and the front surface of said back core are respectively made planar.

8. A magnetic head as claimed in claim 1, wherein said rear end of said center core is made wider than the remaining portions thereof.

9. A magnetic head as claimed in claim 1, wherein said tip member and said center tip are made of Sendust, and wherein said L-shaped core and said back core are made of ferrite.

10. A magnetic head as claimed in claim 1, further comprising tape guide means.

11. A magnetic head as claimed in claim 10, wherein said tape guide means comprises first and second tape guide members, said first tape guide member being disposed on upper surfaces of said head tip and said L-shaped core, said second tape guide member being disposed on lower surfaces of said head tip and said rear end portion of said center core, each of said first and second tape guides projecting beyond the front surface of said head tip.

12. A magnetic erase head for a tape player, comprising a first core having front and rear ends, a winding disposed around said first core, and a second core having front and rear ends, said rear end of said first core being connected to said rear end of said second core, said front end of said second core being shaped to form a slot having one open side, the front end of said first core being positioned within said slot and spaced from said second core so that said front end of said first core and said front end of said second core form a magnetic gap extending along at least two sides of the front end of said second core, said slot being oriented such that said magnetic gap extends across a track on a magnetic tape to erase signals prerecorded on said track and such that the open side of said slot is parallel to said track, said magnetic head being disposed in such a manner that the magnetic tape slides in a direction from one side to the other side of the head tip portion including said magnetic gap, said first core and said second core being oriented in a common plane which is normal to a longitudinal axis of said track.

* * * * *